United States Patent [19]

Ford et al.

[11] 4,448,259
[45] May 15, 1984

[54] RUBBER SPRING FOR FURROW OPENER

[75] Inventors: Arthur J. Ford, Leesburg, Ga.; Patrick Kuhn; William D. Long, both of Bismarck, N. Dak.

[73] Assignee: Lilliston Corporation, Albany, Ga.

[21] Appl. No.: 369,571

[22] Filed: Apr. 19, 1982

[51] Int. Cl.³ ............................................... A01C 5/06
[52] U.S. Cl. ....................... 172/462; 267/153; 267/63 R; 172/573; 172/500; 111/84
[58] Field of Search ............... 172/462, 705, 573, 572, 172/500, 624; 267/21 R, 21 A, 63 R, 141, 153; 111/84

[56] References Cited

U.S. PATENT DOCUMENTS

| 2,361,496 | 10/1944 | Pointer | 267/63 R |
|---|---|---|---|
| 2,917,302 | 12/1959 | Mattern | 267/153 |
| 3,195,918 | 7/1965 | Poole | 267/21 A |
| 3,315,951 | 4/1967 | Boschi | 267/141 X |
| 3,461,816 | 8/1969 | Beck | 267/63 R |
| 3,570,605 | 3/1971 | Rikli | 172/462 |
| 3,845,730 | 11/1974 | Koronka | 172/705 |
| 4,083,412 | 4/1978 | Stocks | 172/462 |
| 4,116,140 | 9/1978 | Anderson | 111/85 X |

FOREIGN PATENT DOCUMENTS 545704 6/1942 United Kingdom ............ 267/21 A

Primary Examiner—Richard J. Johnson
Attorney, Agent, or Firm—Newton, Hopkins & Ormsby

[57] ABSTRACT

A pre-stressed columnar rubber spring interposed between the pressure beam and pivoted draw bar tube of a no-till seed drill deflects under load in one direction only and the force causing increased spring deflection in the principle operational range increases to a desired maximum and then remains substantially constant or decreases slightly thereby relieving the machine of excess stresses caused by contact of coulters and openers with rocks and other field obstructions.

12 Claims, 6 Drawing Figures

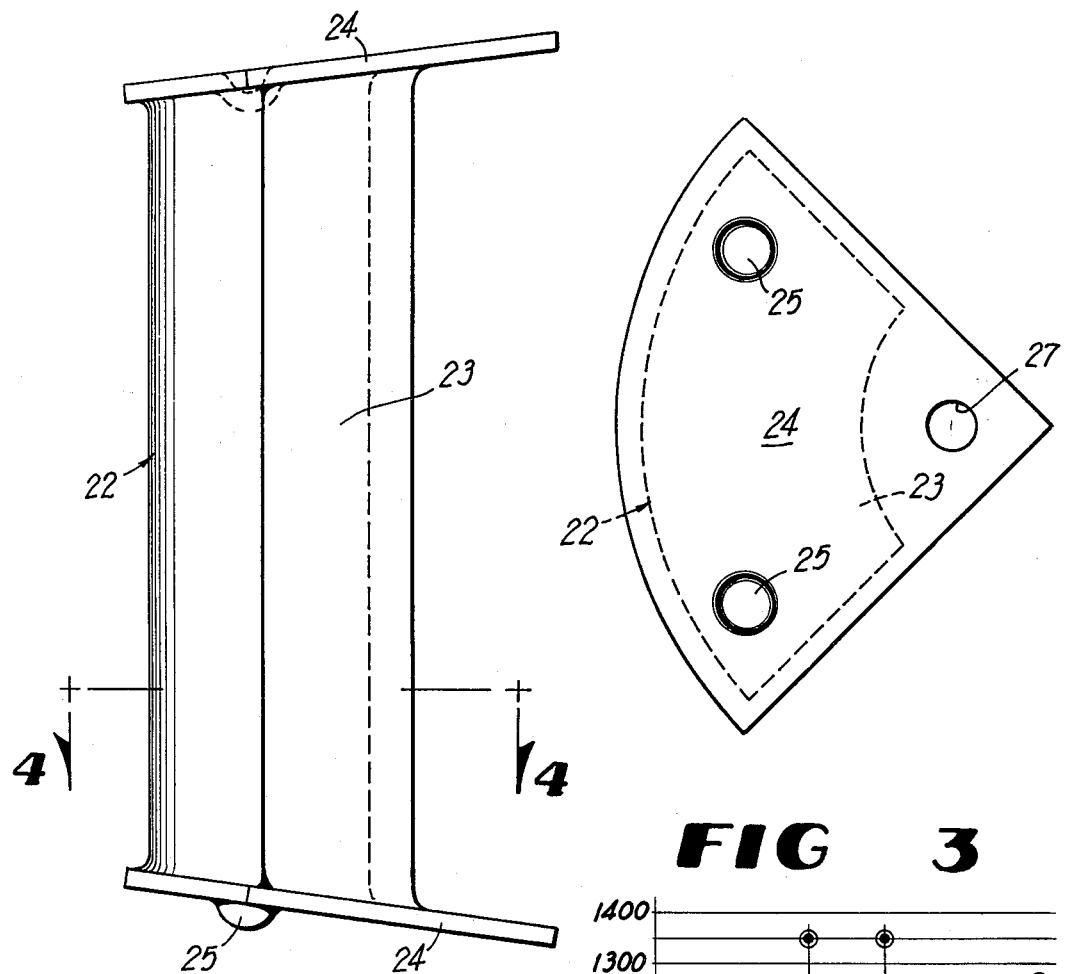
FIG 2
FIG 3
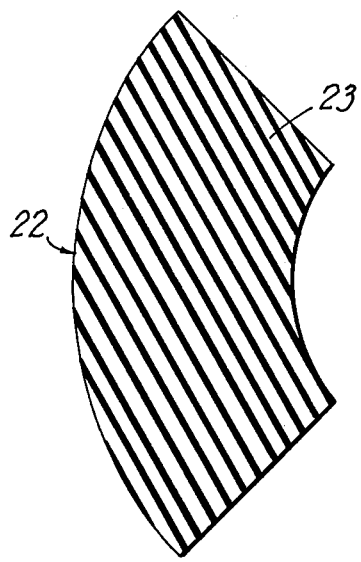
FIG 4
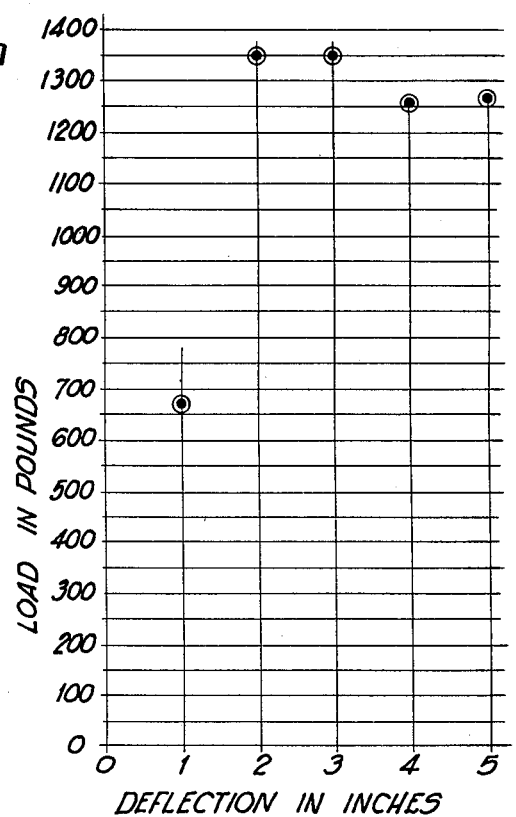
FIG 5

RUBBER SPRING FOR FURROW OPENER

BACKGROUND OF THE INVENTION

U.S. Pat. No. 4,083,412 discloses an ovoid rubber spring to transmit soil penetrating forces to the earth-working members of a seed drill. British Patent specification No. 1,274,219 discloses conical rubber springs for this purpose. In both prior art constructions the forces which resist increased deflection of the rubber springs in the working range due to encountering field obstructions is not constant and in fact increases abruptly. Consequently, as the soil-working members of the machine pass over rocks and the like the frame of the machine and such members must withstand much higher stresses than are encountered in normal operation. Because of this in the prior art, the soil-working members and frame must be designed to withstand these peak stresses, and as a result, are overdesigned for the normal operating loads. Another problem is that high shock loads are imposed on the openers as they are returned to operating positions after having passed over obstructions. This frequently results in field failures of coulters and openers.

The primary object of the present invention is to improve on the known prior art and to fully eliminate the above stated problems through the provision of a rubber spring for a seed drill which will deflect as required in response to the soil-working members of the machine passing or jumping over field obstructions without causing an increase in the force being applied to the spring to resist such deflections. The resistive force in the principle operating range provides for increasing pressures. If the soil-working members encounter an obstruction, the spring force increases to a desired maximum and then remains constant or decreases slightly. Therefore, the soil-working members and the frame of the seed drill do not feel significantly higher stresses than those normally encountered in field operation when the members encounter rocks or other obstructions. Because of this, shock loads on coulters and openers is lessened as they return to normal operating positions in contrast to the prior art employing ovoid or conical rubber springs.

Other features and advantages of the invention will be apparent to those skilled in the art during the course of the following description.

BRIEF DESCRIPTION OF THE DRAWINGS

FIG. 1A is a fragmentary cross-sectional view taken along lines 1A—1A in FIG. 1.

FIG. 2 is an enlarged side elevation of the rubber spring in a relaxed state.

FIG. 3 is a bottom plan view of the rubber spring.

FIG. 4 is a horizontal section taken on line 4—4 of FIG. 2.

FIG. 5 is a chart illustrating spring load vs. deflection.

DETAILED DESCRIPTION

Figure 1:
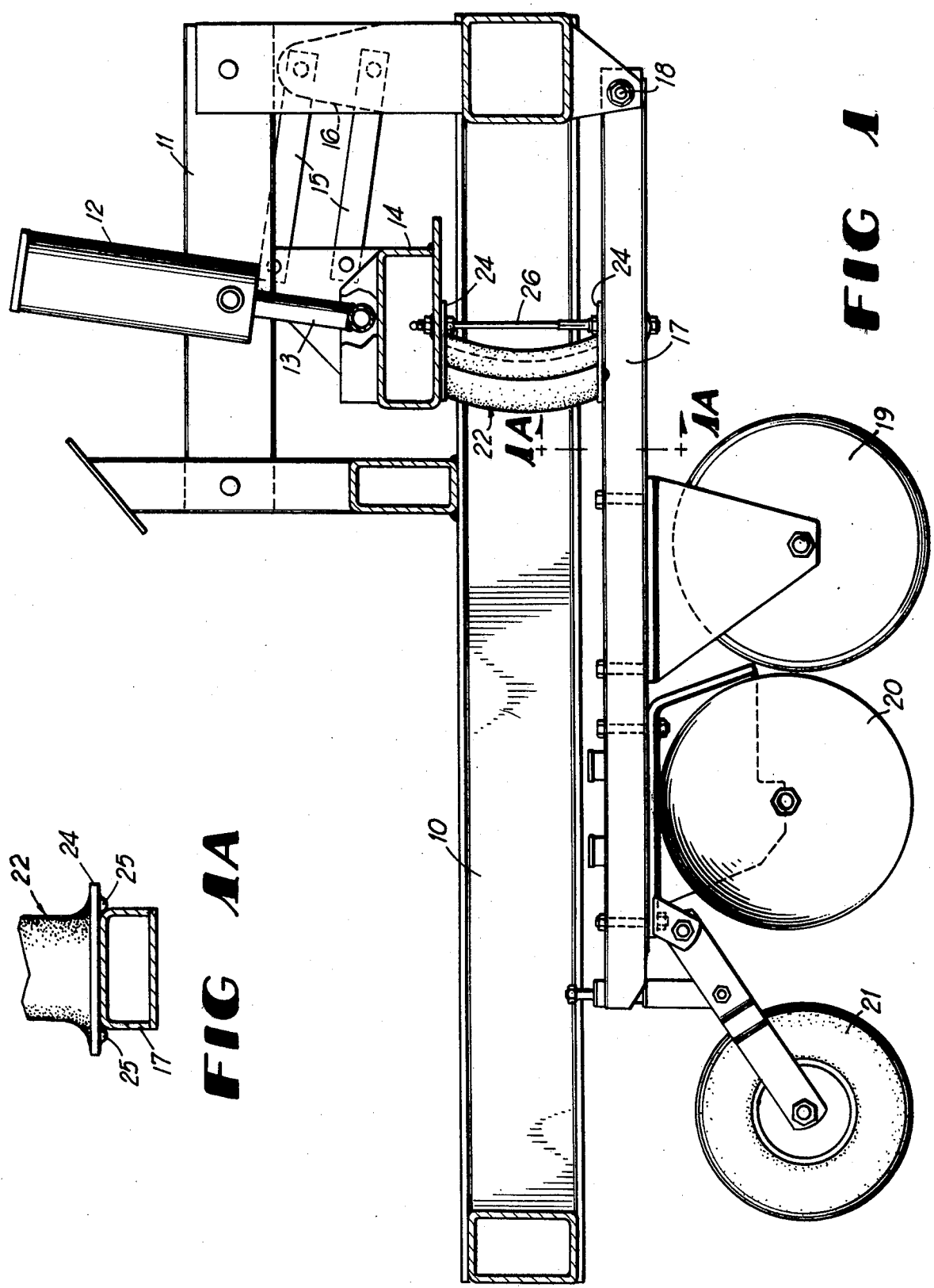
FIG. 1 is a fragmentary side elevation, partly in section, of a no-till seed drill having a rubber spring in accordance with the present invention.

Referring to the drawings in detail wherein like numerals designate like parts, a no-till seed drill comprises a frame 10 including an elevated portion 11 on which is mounted a power cylinder 12 having a piston rod 13 coupled to a pressure beam 14, connected by parallel links 15 to a rigid post 16.

A draw bar tube 17 or tubes underlies the frame 10 and is pivotedly connected thereto at 18 adjacent to the forward end of the draw bar tube. In tandem relationship on the bottom of draw bar tube 17 are mounted a coulter 19, opener 20, and a gauge-press wheel 21. The functions of these earth-working member are well known in the seed planting art and need not be described in detail.

The heart of the present invention is the provision of a "trip-type" rubber spring 22 shown in its working position in FIG. 1 between the pressure beam 14 and draw bar tube 17, and shown in detail in a relaxed state in FIGS. 2, 3 and 4. The spring 22 comprises a solid rubber or rubber-like body portion 23 which is elongated and functions substantially as a column during use, resisting forces applied along its longitudinal axis. In transverse cross-section, FIG. 4, the rubber body portion 23 is arcuate and preferably is configured as a quarter section of an annulus.

Flat metal sector plates 24 are bonded to the opposite end faces of the rubber body portion 23 and are not parallel, but instead are divergent at angles of approximately 7.5° relative to planes perpendicular to the longitudinal axis of the rubber spring. Preferably, the two plates 24 are dimpled near two corners thereof at 25 in the direction shown in the drawings and the plates and rubber body portion form an integral unit. Upper and lower plates 24 are identical for ease of manufacturing, however, only dimples 25 on the lower plate 24 are utilitarian. As seen in FIG. 1A, the dimples 25 on lower plate 24 straddle the upper corners of the draw bar 17 and retain the rubber spring 22 in the proper orientation.

As shown in FIG. 1, the rubber spring 22 is installed between the pressure beam 14 and draw bar tube 17. When installed, the plates 24 are drawn together in parallel relationship by an adjustable tension cable 26, whose opposite end portions are received by openings 27 in the two plates 24 near the third corner of each plate. This imparts to the body portion 23 an initial pre-stressing and arcuate deflection to the rear as shown in FIG. 1. Such initial deflection assures that in operation the rubber spring will always buckle or deflect in one direction, namely to the rear, with respect to the path traveled of the seed drill. The adjustable tension cable 26 also supports the weight of draw bar tube 17, coulter 19, opener 20, and gauge press wheel 21 when these elements are in a raised position for transport.

In the regular operation of the seed drill, the purpose of the rubber spring 22 is to transmit the necessary soil engaging forces to the earth-working elements 19, 20 and 21. The weight of the seed drill must be transferred to the coulters 19 and openers 20 so that they will penetrate the soil, thus allowing seeds to be placed into the ground by the openers in a manner well known in the art.

By means of the hydraulic cylinder 12, or cylinders, and the pressure beam 14, force is applied downwardly to the top of rubber spring 22 which acts substantially as a column. Through the spring 22 or springs, the force is applied to the draw bar tube 17 which, as described, are pivotly suspended from the frame 10. When this is done, the coulters and openers tend to be forced into the soil. The force required to affect soil penetration increases as the depth of penetration increases. The required depth of penetration and the condition of the soil determine the magnitude of the force which must be applied to the draw bar tubes 17 and, consequently, to the tops of rubber springs 22.

As the rubber spring 22 is compressed, it deflects or buckles to the rear as previously explained. The force needed for spring compression increases in direct proportion to the amount of deflection, up to a point, as shown on the chart, FIG. 5. Referring to this chart, in the region between two inches and three inches of deflection, the force necessary for deflection remains constant at 1350 pounds. Between three inches and five inches of spring deflection the force necessary for this deflection actually decreases slightly. This decrease in force required for deflection is due to the buckling effect of the rubber spring.

The heart or essence of the invention resides in the use of the particular form of rubber spring disclosed herein as the resilient member through which forces are transmitted to the soil-working elements 19, 20 and 21 of the seed drill. The benefits derived from the use of this spring on the drill are enormous. The coulters and openers can pass over rocks and other solid obstructions in the field without placing excess stresses on the machine or the coulters and openers. The rubber spring will faithfully reset the openers and coulters after they have cleared a particular obstacle. The basis for this unique mode of operation as graphically illustrated in FIG. 5 is the fact that after a certain force is attained, the force required for spring deflection remains constant or slightly decreases. Because of this phenomenon, the stated drawbacks of the prior art are completely overcome in the present invention, as should now be fully apparent to those skilled in the art.

It is to be understood that the form of the invention herewith shown and described is to be taken as a preferred example of the same, and that various changes in the shape, size and arrangement of parts may be resorted to, without departing from the spirit of the invention or the scope of the subjoined planes.

We claim:

1. A rubber spring device for a furrow opener comprising a solid rubber body portion having opposite end faces which diverge when said body portion is in a relaxed state, the body portion being elongated between its end faces and being adapted to function as a resilient column in response to forces applied to its end faces along its longitudinal axis, and adjustable tension means connected between said end faces to draw the end faces into parallel relationship and to cause initial prestressing of the spring device by effecting initial arcuate deflection of the body portion in one direction across the longitudinal axis of the body portion, said adjustable tension means including a pair of plate elements fixed to said end faces of the body portion and an adjustable tension element connected between the plate elements and being spaced from one side of the body portion, said solid rubber body portion being arcuate in cross section, the cross-sectional shape of said body portion being approximately one-quarter of an annulus.

2. A rubber spring assembly for a furrow opening device comprising a resilient body portion having opposite end faces, said spring assembly including means for transmitting the compressive forces to said body portion to cause initial prestressing by effecting initial arcuate deflection of said body portion in one direction across the longitudinal axis of said body portion so that subsequent buckling thereof will occur in said one direction only, said solid rubber body portion being arcuate in cross section, and the cross-sectional shape of said body portion being approximately one-quarter of an annulus.

3. In a furrow opener, a support frame, drawbar means pivotally connected to the support frame, soil-engaging means including an opener and gauge press wheel on the drawbar means, power means on the support frame to apply a downward force to the drawbar means, a columnar spring device connected between said power means and drawbar means and being prestressed and arcuately predeflected in one direction of bending from the column axis of the spring device, the spring device having a substantially solid bendable resilient body portion, and the arrangement of the spring device being such that up to a predetermined point in the deflection range of the spring device its load resistance in response to bending deflection increases and beyond such point in the deflection range no increased load resistance accompanies further bending deflection of the spring device.

4. In a furrow opener as defined in claim 3, and said solid bendable resilient body portion being formed of rubber-like material.

5. In a furrow opener as defined in claim 4, and said spring device when in a relaxed state having divergent end faces.

6. In a furrow opener as defined in claim 5, and said divergent end faces being defined by a pair of divergent end plates extending beyond one side of said body portion, and a tension element connected between the extending portions of the end plates and serving to prestress and arcuately predeflect the spring device by bending in one direction from its column axis whereby subsequent bending deflection of the spring device will occur in the same direction.

7. A spring device for a furrow opener comprising a resilient columnar bendable spring body portion having divergent end faces when the spring body portion is in a relaxed state, the spring body portion being elongated along its column axis, and tension means connected between said end faces to draw the end faces into substantially parallel relationship to cause prestressing of the spring device and arcuate bending deflection thereof in one direction from said column axis, whereby subsequent loading of the spring device along said column axis will produce further bending deflection thereof in said one direction.

8. A rubber spring device for a furrow opener comprising a solid rubber-like body portion having opposite end faces which diverge when said body portion is in a relaxed state, the body portion being elongated between said end faces and functioning as a resilient column in response to force applied against said end faces along the column axis of the body portion, and tension means connected between said end faces to draw them into parallel relationship to cause prestressing of the spring device by initial arcuate bending deflection of the body portion in one direction from said column axis.

9. A rubber spring device for a furrow opener, as defined in claim 8, and the adjustable tension means comprising a pair of plate elements fixed to said end faces of the body portion, and an adjustable tension element connected between the plate elements and being spaced from one side of the body portion.

10. A rubber spring device for a furrow opener, as defined in claim 9, and the solid rubber body portion being arcuate in cross-section.

11. A rubber spring device for a furrow opener, as defined in claim 9, and the adjustable tension element comprising a cable, and opposite end threaded adjustable terminal means on the cable.

12. A rubber spring device for a furrow opener comprising a solid rubber-like body portion having opposite end faces which diverge when said body portion is relaxed, said body portion being elongated between its end faces and being adapted to function as a resilient column in response to forces applied to its end faces along its longitudinal axis, and solid rubber body portion affording arcuate bending deflection capability from said axis in one direction of bending, and said body portion being arcuate in cross section and approximating a quarter section of an annulus.

* * * * *